May 21, 1929.  E. R. SEWARD  1,714,320
APRON MECHANISM FOR LATHES
Filed Oct. 7, 1927  2 Sheets-Sheet 1
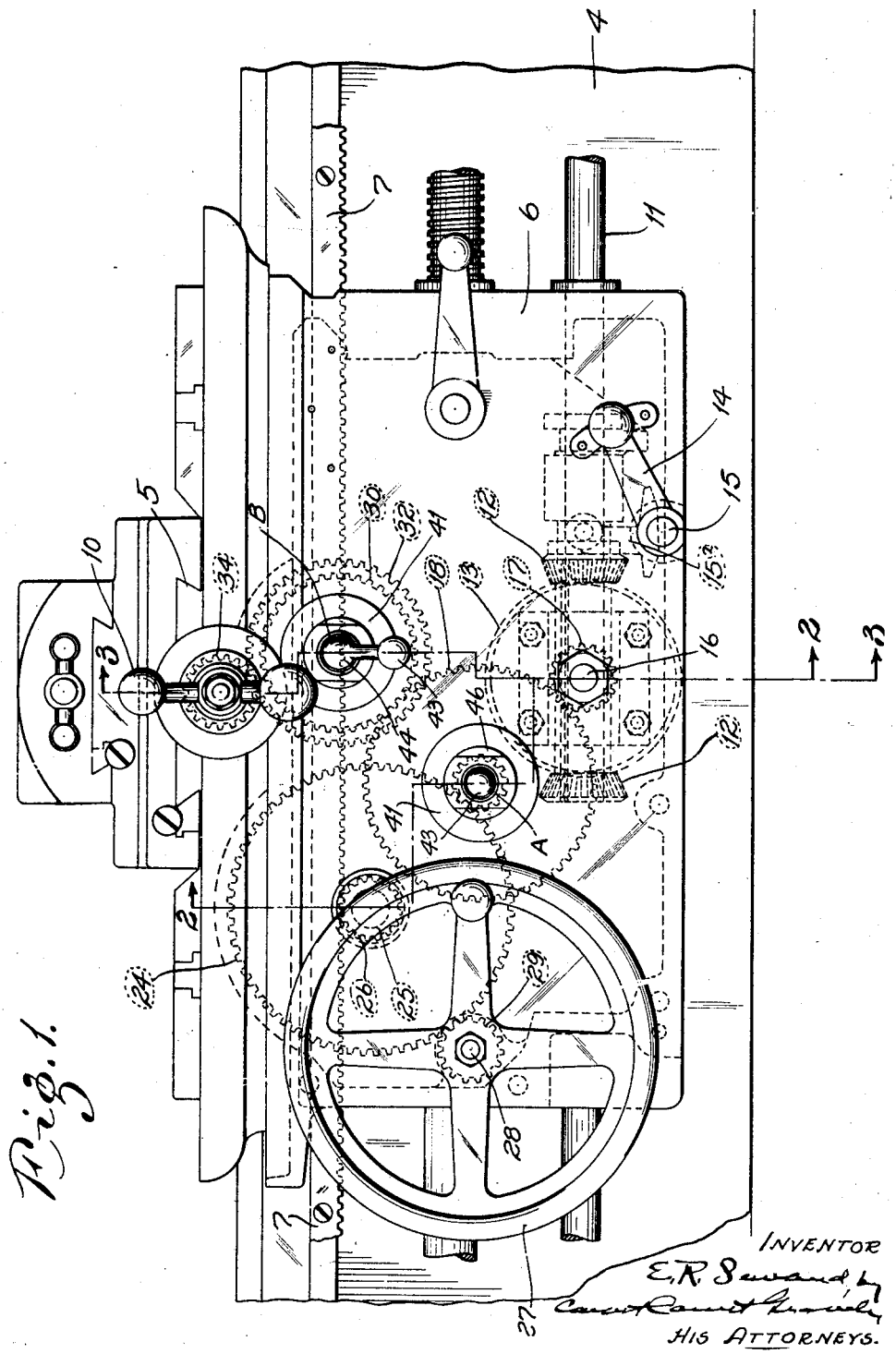

May 21, 1929.  E. R. SEWARD  1,714,320
APRON MECHANISM FOR LATHES
Filed Oct. 7, 1927   2 Sheets-Sheet 2
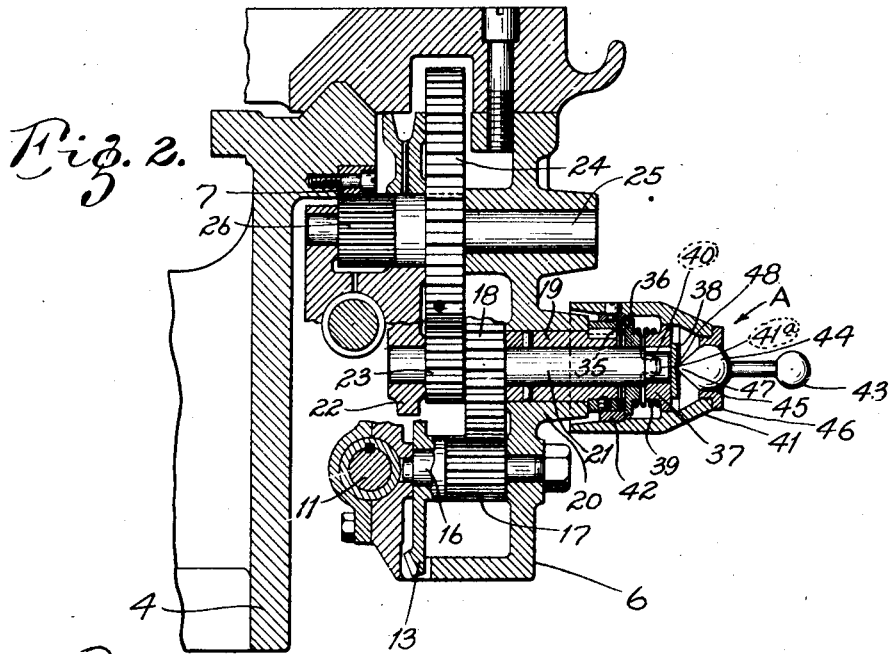
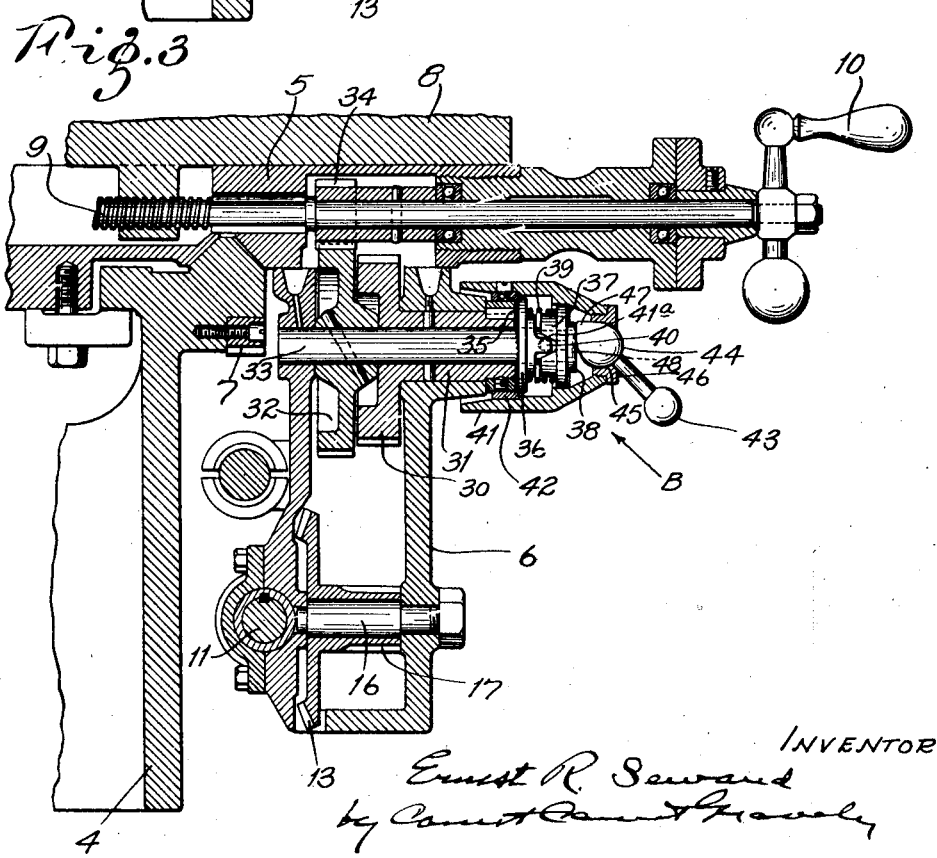
INVENTOR.
Ernest R. Seward
by Cornett _____ Gravely
HIS ATTORNEY Patented May 21, 1929.

1,714,320

UNITED STATES PATENT OFFICE.

ERNEST R. SEWARD, OF ST. LOUIS, MISSOURI, ASSIGNOR TO LEHMANN MACHINE COMPANY, OF ST. LOUIS, MISSOURI, A CORPORATION OF MISSOURI.

APRON MECHANISM FOR LATHES.

Application filed October 7, 1927. Serial No. 224,562.

This invention relates to lathes and has for its principal objects to produce a simple and efficient clutch mechanism for quickly and easily controlling the longitudinal and transverse movements of the tool support. Other objects are to prevent slipping of the clutch mechanism under a heavy load and to provide for cheapness and durability of construction and compactness of design. The invention consists in the improved clutch mechanism and in the construction, combinations and arrangements of parts hereinafter described and claimed.

In the accompanying drawings, which form part of the specification and wherein like symbols refer to like parts wherever they occur, Fig. 1 is a front view of a portion of a lathe having an apron provided with clutches embodying my invention;

Fig. 2 is a vertical cross-section through the carriage apron on the line 2—2 in Fig. 1; and Fig. 3 is a vertical cross-section on the line 3—3 in Fig. 1.

In the accompanying drawings, my invention is shown in connection with the power transmission mechanism of the carriage apron of a lathe for transmitting motion from the feed rod of the lathe to the carriage thereof or to the cross feed slide thereof. The lathe shown in the drawings comprises a bed 4; a carriage 5 slidable on said bed and provided with a depending apron 6, within which is housed a power transmission mechanism in the form of a gear reduction train; a feed rack 7 secured to said bed in position to intermesh with one of the gears of said gear train for sliding said carriage along said bed; a cross feed slide 8 slidable on said carriage and threaded to receive the threaded portion of a cross feed screw 9, which is journaled in the apron and is adapted to be manually rotated by means of a handle 10 or by means of said gear train; and a feed rod 11 rotatably supported on the lathe bed and adapted to be coupled with said gear train to drive the same to actuate said carriage or said cross feed slide.

The mechanism for coupling the feed rod 11 with the gear train in the carriage apron 6 comprises a pair of bevel pinions 12 splined on said feed rod and adapted to be selectively intermeshed with a bevel reversing gear 13, according to the direction which is desired to move the carriage 5 or the cross feed slide 8, by means of an operating handle 14 fixed to a shaft 15 journaled in said apron and operatively connected with said bevel pinions by means of a shifter arm 15ª fixed to said shaft. The bevel reversing gear 13 is journaled on a horizontal shaft 16 fixed to the apron; and the hub portion of said reversing gear is provided with a pinion gear 17, which constitutes part of the hereinbefore mentioned gear reduction train. The lathe mechanism thus far described is well known and it is considered unnecessary to illustrate it in detail.

The pinion 17 meshes with a driving gear 18 having a hub portion 19 journaled in a bearing 20 provided therefor in the front wall of the apron; and a horizontal shaft 21 has its forward end portion journaled in the hub of said driving gear and has its rear end portion journaled in the bearing 22 provided therefor in the rear wall of said apron. The shaft 21 is provided between the opposing faces of the driving gear 18 and the rear wall of the apron with a pinion 23 which meshes with a large gear 24 keyed to a shaft 25 journaled in the apron and provided with a pinion gear 26 which meshes with the longitudinal feed rack 7 fixed to the lathe bed 4. By this arrangement the carriage may be moved longitudinally of the lathe bed in either direction of its sliding movement by engaging one or the other of the sliding bevel pinions 12 on the feed rod 11 with the bevel reversing gear 13, the drive being taken from the pinion gear 7 on the hub of the reversing gear 13 to the rack 7 through the driving gear 18, the pinion 23, the gear 24 and the pinion 26 which meshes with said rack. The carriage may also be moved by hand by means of a hand wheel 27 fixed to the outer end of a shaft 28, which is journaled in the carriage apron and is provided at its inner end with a pinion 29 which meshes with the large gear 24 of the carriage apron gearing.

The gearing for transmitting motion from the feed rod 11 to the cross feed slide 8 comprises the bevel pinions 12, the bevel reversing gear 13, the pinions 17 on the hub of said reversing gear, the large driving gear 18, a driving gear 30 having a hub portion 31 journaled in a bearing provided therefor in the front wall of the apron, and a gear 32 fixed to a shaft 33 journaled at one end in the hub 31 of the gear 30 and at the other end in the rear wall of said apron and meshing with a gear 34 fixed to the cross feed screw 9.

The carriage apron is provided with a clutch device A for connecting the shaft 21 having the pinion 23 thereon with the continuously rotating driving gear 18 when it is desired to impart a sliding movement to the carriage; and said carriage is also provided with a similar clutch device B for connecting the shaft 33 having the pinion gear 32 fixed thereto with the continuously rotating drive gear 30 fixed thereto when it is desired to impart a sliding movement to the cross feed slide.

The clutch device A, which controls the sliding movement of the carriage, comprises a toothed inner clutch ring 35 fixed to the outer end of the hub portion 19 of the continuously rotating driving gear 18, a toothed intermediate clutch ring 36 rotatably supported on the outer end portion of the shaft 21 journaled in said hub portion of said driving gear, and an annular outer member or dog 37 keyed to the outer end of said shaft and held against sliding movement thereon between a shoulder on said shaft and the head of a screw 38 threaded into the outer end of said shaft. The opposing faces of the clutch rings 35 and 36 are provided with radial clutch teeth; and a coil spring 39 is interposed between the clutch ring 35 and the annular dog and operates to force the clutch ring 36 into engagement with the clutch ring 35. The movable clutch ring 36 is provided on its outer face with diametrically opposed lugs 40, which seat in diametrically opposed V-shaped notches 41ª formed in the adjacent face of the annular dog 37 fixed to the outer end of the shaft 21, whereby the ring 36 is adapted to drive said dog when in engagement with the clutch ring 35 fixed to the hub of the continuously rotating gear 18. The clutch mechanism is located within a cylindrical housing or shell 41, which has a ring 42 fixed therein forming an annular shoulder adapted to abut against the rear face of the slidable clutch ring 36 to disengage it from the continuously rotating clutch ring 35 when said housing or shell is slid outwardly. The cylindrical housing or shell is slid outwardly against the pressure of the spring 39 to disengage the clutch ring 36 from the clutch ring 37 by means of a trip handle or lever 43 having a ball-shaped inner end portion 44 mounted in a socket 45 provided therefor in a cap 46 threaded into the outer end of said housing. The ball-shaped inner end portion 44 of the trip lever or handle 43 terminates in a cam-shaped or pointed end 47 adapted to seat in a depression 48 provided therefor in the center of the head of the screw 38 when said trip lever or handle is swung into axial alinement with the shaft 21.

By the arrangement described, when the trip lever 43 is swung into axial alinement with the shaft 21, the pointed inner end 47 of said lever bears against the head of the screw 38 and thus forces the shell or housing 41 of the clutch device outwardly, which action causes the ring 42 carried by said housing to abut against the clutch ring 36 and hold the same out of engagement with the clutch ring 37, whereby no movement is imparted to the shaft 21. When it is desired to couple the shaft 21 to the continuously rotating gear 18, the trip lever is swung into a position which will disengage the pointed end thereof from the head of a screw thereby permitting the housing to slide inwardly under pressure of the spring 39, which then forces the clutch member 36 into engagement with the clutch member 35. With the parts in this position, the motion is transmitted from the gear 18 to the shaft 21 through the clutch rings 35 and 36 and the annular dog 37.

As stated above, the clutch member B for transmitting motion from the gear train to the cross feed slide is identical with the clutch member A, the clutch device B having the clutch ring 35 secured to the hub 31 of the continuously rotating gear 30, and the annular dog 37 rigidly secured to the shaft 33.

The hereinbefore described clutch mechanism is strong, simple, compact and easy to manufacture and assemble; it is easy to operate, and the position of the trip handle will show at a glance whether the clutch is engaged or disengaged; it prevents slipping of the clutch members under a heavy load by reason of the great endwise pressure directed against the slidable clutch ring due to the pressure of lugs thereof against the inclined sides of the notches in the annular dog.

Obviously the hereinbefore described mechanism admits of considerable modification without departing from the invention and is capable of extensive application; and it is not restricted to the precise construction and arrangement of parts shown and described, nor to lathes.

What I claim is:

1. A transmission mechanism comprising a rotary shaft, a gear journaled on said shaft, a member sleeved on said shaft and slidable longitudinally thereof, said gear and said slidable member being provided with cooperating clutch portions, means for shifting said slidable clutch member into engagement with said gear, and a driving connection between said slidable clutch member and said shaft, said connection including means for causing an end thrust on said slidable member in the direction of said gear and for automatically increasing or decreasing such end thrust as the resistance to the clutch drive increases or decreases.

2. A transmission mechanism comprising a rotary shaft, a gear journaled on said shaft, a clutch member fixed to said gear, a clutch member sleeved on said shaft and slidable longitudinally thereof into engagement with the clutch member on said gear, and a driving connection between said slidable clutch member and said shaft, said driving connection including means for creating an end thrust on said slidable clutch member sufficient to maintain the slidable clutch member in operative engagement with the clutch member on said gear and for automatically increasing or decreasing such end thrust as the resistance to the clutch drive increases or decreases.

3. A transmission gear comprising a rotary shaft, a gear journaled on said shaft, a clutch fixed to said gear, a clutch sleeved on said shaft and adapted to be moved longitudinally thereof into and out of engagement with the clutch member on said gear, a driving connection between the slidable clutch member and said shaft, said connection including means for maintaining the slidable clutch member in engagement with the clutch member on said gear, and means for holding said slidable clutch member out of engagement with the clutch member on said gear, and for automatically increasing or decreasing such end thrust as the resistance to the clutch drive increases or decreases.

4. A transmission gear comprising a rotary shaft, a gear journaled on said shaft, a clutch fixed to said gear, a clutch sleeved on said shaft and adapted to be moved longitudinally thereof into and out of engagement with the clutch member on said gear, a driving connection between the slidable clutch member and said shaft, said connection being shaped and arranged to maintain the slidable clutch member in engagement with the clutch member on said gear, and means for holding said slidable clutch member out of engagement with the clutch member on said gear, said means comprising a hollow shell surrounding said clutch members and having a portion adapted to abut against said slidable clutch member to hold the same out of engagement with the clutch member on said gear.

5. A transmission gear comprising a rotary shaft, a gear journaled on said shaft, a clutch fixed to said gear, a clutch sleeved on said shaft and adapted to be moved longitudinally thereof into and out of engagement with the clutch member on said gear, a driving connection between the slidable clutch member and said shaft, said connection being shaped and arranged to maintain the slidable clutch member in engagement with the clutch member on said gear, means for holding said slidable clutch member out of engagement with the clutch member on said gear, said means comprising a shell surrounding said clutch members and having a portion in position to abut against said slidable clutch member, and a member mounted on said shell for moving the same longitudinally of said shaft to cause the abutment portion of said shell to engage said slidable clutch member and move the same out of engagement with the clutch member on said gear.

6. A transmission mechanism comprising a rotary shaft, a gear journaled on said shaft, a clutch member fixed to said gear, a clutch member sleeved on said shaft slidable longitudinally thereof into engagement with the clutch member of said gear, a driving connection between the said slidable clutch member and said shaft, a spring normally tending to hold said slidable clutch member in engagement with the clutch member on said gear, a cylindrical shell surrounding said clutch members and having a portion adapted to engage said slidable clutch member, and means for shifting said shell longitudinally of said shaft to cause the abutment portion of said shell to engage said slidable clutch and disengage the same from the clutch on said gear.

7. A transmission mechanism comprising a rotary shaft, a gear journaled on said shaft, a clutch member fixed to said gear, a clutch member sleeved on said shaft slidable longitudinally thereof into engagement with the clutch member of said gear, a driving connection between the said slidable clutch member and said shaft, a spring normally tending to hold said slidable clutch member in engagement with the clutch member on said gear, a cylindrical shell surrounding said clutch members and having a portion adapted to engage said slidable clutch member, means for shifting said shell longitudinally of said shaft to cause the abutment portion of said shell to engage said slidable clutch and disengage the same from the clutch on said gear, said means comprising a trip lever fulcrumed on said shell and having a portion adapted to engage the end of said shaft and force the shell in a direction which will cause the abutment thereof to engage the slidable clutch member and move the same out of engagement with the clutch member on said gear.

8. A transmission mechanism comprising a rotary shaft, a gear journaled on said shaft, a clutch member fixed to said gear, a clutch member sleeved on said shaft and adapted to slide longitudinally thereof into and out of engagement with the clutch member on said gear, said slidable clutch member having outstanding lugs, an annular dog fixed to said shaft and having notches which straddle the lugs on said slidable clutch member, a spring disposed between said annular dog and said slidable clutch member and normally tending to force said slidable clutch member into engagement with the clutch member on said gear, a sleeve surrounding said clutch members and slidable longitudinally thereof, said sleeve having a portion adapted to abut against said slidable clutch member, and means for sliding said sleeve in a direction which will cause the sleeve to abut against the slidable clutch member and move the same out of engagement with the clutch on said gear.

9. A transmission mechanism comprising a rotary shaft, a gear journaled on said shaft, a clutch member fixed to said gear, a clutch member sleeved on said shaft and adapted to slide longitudinally thereof into and out of engagement with the clutch member on said gear, said slidable clutch member having outstanding lugs, an annular dog fixed to said shaft and having notches adapted to receive the lugs on said slidable clutch member, a spring disposed between said annular dog and said slidable clutch member and normally tending to force said slidable clutch member into engagement with the clutch member on said gear, a sleeve surrounding said clutch members and slidable longitudinally thereof, said sleeve having a portion adapted to abut against said slidable clutch member, and means for sliding said sleeve in a direction which will cause the sleeve to abut against the slidable clutch member and move the same out of engagement with the clutch on said gear, said means comprising a trip lever having a ball-shaped inner end portion journaled in said sleeve opposite the outer end of said shaft and having end pointed inner end portion adapted to engage the outer end of said shaft to slide said shell longitudinally thereof.

Signed at St. Louis, Missouri, this 28 day of Sept., 1927.

ERNEST R. SEWARD.

CERTIFICATE OF CORRECTION.

Patent No. 1,714,320.                                                   Granted May 21, 1929, to

ERNEST R. SEWARD.

It is hereby certified that error appears in the printed specification of the above numbered patent requiring correction as follows: Page 4, line 43, claim 9, for the word "shell" read "sleeve"; and that the said Letters Patent should be read with this correction therein that the same may conform to the record of the case in the Patent Office.

Signed and sealed this 18th day of June, A. D. 1929.

M. J. Moore, (Seal)                                                      Acting Commissioner of Patents.